United States Patent
Itakura

(10) Patent No.: US 12,493,936 B2
(45) Date of Patent: Dec. 9, 2025

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Kina Itakura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 326 days.

(21) Appl. No.: 18/152,836

(22) Filed: Jan. 11, 2023

(65) Prior Publication Data
US 2023/0245280 A1 Aug. 3, 2023

(30) Foreign Application Priority Data
Feb. 3, 2022 (JP) .................... 2022-015888

(51) Int. Cl.
G06T 5/73 (2024.01)
G06T 5/10 (2006.01)
G06T 7/70 (2017.01)

(52) U.S. Cl.
CPC .......... *G06T 5/73* (2024.01); *G06T 5/10* (2013.01); *G06T 7/70* (2017.01); *G06T 2207/10012* (2013.01); *G06T 2207/20024* (2013.01)

(58) Field of Classification Search
CPC .... G06T 5/73; G06T 5/10; G06T 7/70; G06T 2207/10012; G06T 2207/20024;
(Continued)

(56) References Cited

U.S. PATENT DOCUMENTS

| 6,414,681 B1 * | 7/2002 | Ohshima et al. ....... G06T 15/00 345/428 |
| 6,570,566 B1 | 5/2003 | Yoshigahara |

(Continued)

FOREIGN PATENT DOCUMENTS

| CN | 109242943 A | 1/2019 |
| JP | H11-155154 A | 6/1999 |

(Continued)

OTHER PUBLICATIONS

Sep. 24, 2025 Japanese Official Action in Japanese Patent Appln. No. 2022-015888.

*Primary Examiner* — Matthew C Bella
*Assistant Examiner* — Daniel Joseph Santos
(74) *Attorney, Agent, or Firm* — Venable LLP

(57) ABSTRACT

An image data obtaining unit obtains stereo image data from an input I/F or a secondary storage device. A parallax data obtaining unit obtains parallax data corresponding to the stereo image data from the image data obtaining unit. A line-of-sight information obtaining unit obtains line-of-sight information of a user wearing a head mounted display from a line-of-sight detection apparatus via a line-of-sight detection I/F. A process region determination unit generates a sharpness map based on the parallax data from the parallax data obtaining unit and the line-of-sight information from the line-of-sight information obtaining unit. A sharpness changing unit performs sharpness changing image processes on the stereo image data from the image data obtaining unit, based on the sharpness map from the process region determination unit. A display control unit displays the stereo image subjected to the sharpness change by the sharpness changing unit, on the head mounted display.

15 Claims, 8 Drawing Sheets

(58) Field of Classification Search
CPC .............. G06T 5/70; G06T 2207/20012; G06T 2207/30041; G06T 5/50; G06T 15/10; G06T 15/00; G06T 15/20; G06T 19/00; H04N 13/122; H04N 13/128; H04N 13/106; H04N 13/239; H04N 13/261; H04N 13/398; H04N 13/111; H04N 13/00; H04N 13/344; H04N 13/117; G02B 27/0172; G02B 27/017; G02B 27/0093; G02B 30/27; G03B 35/08; G06F 3/01; G06F 3/013; G06F 3/011; G06F 3/012
USPC ........................................................ 382/100
See application file for complete search history.

(56) References Cited

U.S. PATENT DOCUMENTS

| | | | |
|---|---|---|---|
| 8,908,959 B2 | 12/2014 | Taguchi | |
| 11,006,093 B1* | 5/2021 | Hegyi | ................. H04N 13/246 |
| 11,295,528 B2 | 4/2022 | Chao | |
| 11,386,527 B2 | 7/2022 | Kikukawa | |
| 11,699,215 B2* | 7/2023 | Springer et al. | ........ G06T 5/003 |
| 2012/0070069 A1 | 3/2012 | Taguchi | |
| 2016/0270656 A1* | 9/2016 | Samec et al. | ............ A61B 3/14 |
| 2018/0007258 A1 | 1/2018 | Seko | |
| 2020/0051528 A1 | 2/2020 | Huang | |
| 2020/0372615 A1* | 11/2020 | Ida | ........................ G06T 5/003 |
| 2021/0027541 A1 | 1/2021 | Chao | |
| 2021/0058604 A1* | 2/2021 | Nakata | ................. H04N 13/243 |
| 2021/0082088 A1 | 3/2021 | Kikukawa | |

FOREIGN PATENT DOCUMENTS

| | | | | |
|---|---|---|---|---|
| JP | 2000-354257 A | 12/2000 | | |
| JP | 2012-063987 A | 3/2012 | | |
| JP | 5697803 B2 | 4/2015 | | |
| JP | 2018-006914 A | 1/2018 | | |
| WO | 2013015217 A1 * | 1/2013 | ............. | H04N 5/147 |
| WO | 2019/150668 A1 | 8/2019 | | |

* cited by examiner

IMAGE PROCESSING APPARATUS, IMAGE PROCESSING METHOD, AND STORAGE MEDIUM

BACKGROUND OF THE INVENTION

Field of the Invention

The present disclosure relates to an image processing technology of generating a stereo image.

Description of the Related Art

In recent years, a display apparatus that can display a stereo image including an image for the left eye and an image for the right eye with parallax has been sold as a display apparatus used to allow a viewer to enjoy stereoscopic videos. As an example of such a display apparatus, there is a head mounted display worn on the head for video viewing.

The stereo image with parallax is generated by using three-dimensional computer graphics (3D-CG), captured images obtained by performing image capturing with an image capturing apparatus including multiple lenses, or the like. Generally, a blur amount of a subject in the stereo image is determined depending on a focal length set in generation of the image, as in normal images. Meanwhile, humans perceive depth based on a blur amount of a perceived image, an angle (angle of convergence) formed between both eyes, and the like, in addition to differences (binocular parallax) in perception with both eyes. Accordingly, in the case where the angle of convergence and the blur amount of a subject of interest are different from those in the real world in viewing of the stereo image, the viewer experiences a feeling of strangeness. This feeling of strangeness increases cognitive load, and eyestrain or a decrease in a sense of immersion may occur.

Japanese Patent Laid-Open No. 2018-006914 discloses a system that generates and displays a stereo image with parallax from an image obtained by performing image capturing with an image capturing apparatus controlled such that a subject of interest paid attention by a user wearing a head mounted display is in focus.

There is not only a stereo image generated based on an image generated after setting of a subject of interest like the stereo image described in Japanese Patent Laid-Open No. 2018-006914, but also a stereo image generated from an image before the setting of the subject of interest. Since a focal length of an image cannot be changed after generation, the technology of Japanese Patent Laid-Open No. 2018-006914 cannot reduce the cognitive load of the viewer and improve realistic sensations and the sense of immersion for the stereo image generated from the image before the setting of the subject of interest.

SUMMARY OF THE INVENTION

An image processing apparatus according to an aspect of the present disclosure is an image processing apparatus including: an image obtaining unit that obtains a captured image which is a stereo image including an image for a left eye and an image for a right eye with parallax, the captured image being such an image that a focal length in image capturing is predetermined; and an image processing unit that performs different image processes respectively on a region of interest paid attention by a viewer viewing the stereo image displayed on a display apparatus and a region other than the region of interest, based on line-of-sight information of the viewer, without changing the focal length in the stereo image.

Further features of the present invention will become apparent from the following description of exemplary embodiments with reference to the attached drawings.

DESCRIPTION OF THE EMBODIMENTS

Figure 1:
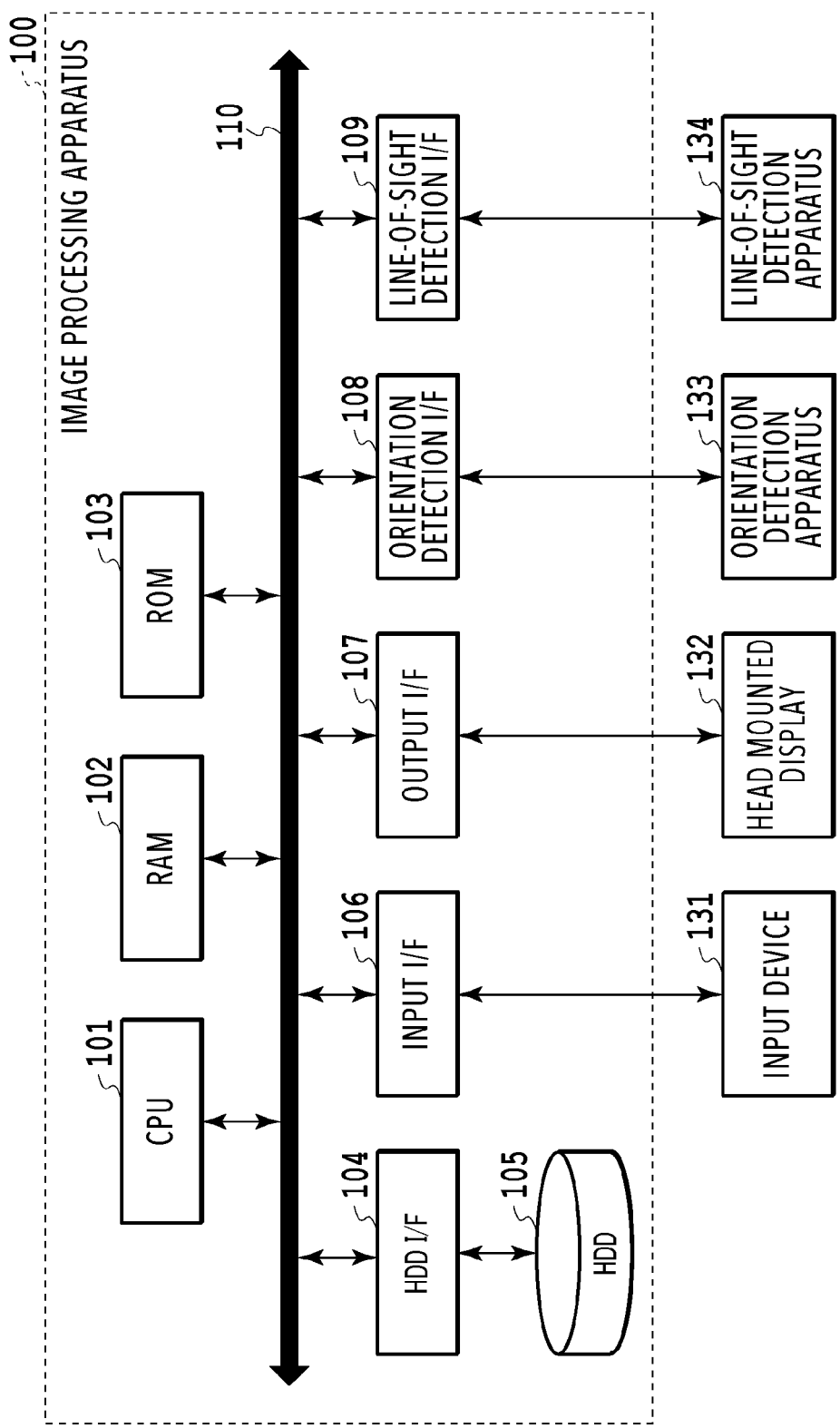
FIG. 1 is a block diagram illustrating a hardware configuration of an image processing apparatus.

Embodiments of the present disclosure are described below with reference to the drawings. Note that the following embodiments do not limit the present disclosure, and not all of combinations of features described in the present embodiments are necessarily essential for the solving means of the present disclosure. Note that the same configurations are described while being denoted by the same reference numerals.

Embodiment 1

In Embodiment 1, description is given of a method of converting an existing stereo image to a stereo image in which a region to which a user viewing the stereo image is paying attention is made shaper than other regions, based on line-of-sight information of the user and parallax data obtained from the stereo image.

FIG. 1 illustrates a hardware configuration example of an image processing apparatus according to the present embodiment. In FIG. 1, a CPU 101 executes programs stored in a ROM 103 and a hard disk drive (HDD) 105 while using a RAM 102 as a work memory, and controls operations of blocks to be described later via a system bus 110. An HDD interface (hereinafter, interface is written as "I/F") 104 connects a secondary storage device such as the HDD 105 and an optical disc drive. The HDD I/F 104 is, for example, an I/F such as serial ATA (SATA). The CPU 101 can read out data from the HDD 105 and write data to the HDD 105 via the HDD I/F 104. Moreover, the CPU 101 can develop data stored in the HDD 105 on the RAM 102, and can conversely save the data developed on the RAM 102 in the HDD 105. The CPU 101 can execute the data developed on the RAM 102 as a program.

An input I/F 106 connects an input device 131 such as a keyboard, a mouse, a digital camera, and a scanner. Moreover, the input I/F 106 can connect a stereo camera provided in a head mounted display as the input device 131. The input I/F 106 is, for example, a serial bus I/F such as USB or IEEE 1394. The CPU 101 can read data from the input device 131 via the input I/F 106. An output I/F 107 connects the image processing apparatus 100 and a head mounted display 132 that is an output device to each other. The output I/F 107 is, for example, a video output I/F such as DVI or HDMI (registered trademark). The CPU 101 can send data to the head mounted display 132 via the output I/F 107 and cause the head mounted display 132 to display a predetermined video. An orientation detection I/F 108 connects an orientation detection apparatus 133 such as an acceleration sensor or an angular velocity sensor. The orientation detection I/F 108 is, for example, a serial bus I/F such as USB or IEEE 1394. The orientation detection apparatus 133 is attached to the head mounted display 132, and the CPU 101 can read orientation information of the head mounted display 132 from the orientation detection apparatus 133 via the orientation detection I/F 108. The orientation information can be also inputted via a mouse, a keyboard, a camera, and the like. A line-of-sight detection I/F 109 connects a line-of-sight detection apparatus 134 such as an eye tracking device. The line-of-sight detection I/F 109 is, for example, a serial bus I/F such as USB or IEEE 1394. The line-of-sight detection apparatus 134 is attached to the inside of the head mounted display 132, and the CPU 101 can read line-of-sight information of a user wearing the head mounted display 132 from the line-of-sight detection apparatus 134 via the line-of-sight detection I/F 109. The line-of-sight information can be also inputted via a mouse, a keyboard, a camera, and the like. Although there are components of the image processing apparatus 100 other than those described above, such components are not the focus of the present disclosure, and description thereof is thus omitted.

An outline of a method of generating stereo image data for display that is performed in the present embodiment is described. The stereo image data for display to be displayed on the head mounted display 132 is generated from inputted stereo image data, based on position/orientation information of the user wearing the head mounted display 132. In the present embodiment, the stereo image data for display is generated by subjecting existing stereo image data to a filtering process of making the sharpness of a region of interest paid attention by the user higher than the sharpness of regions other than the region of interest. The filtering process of changing the sharpness is performed as appropriate depending on characteristics of the inputted stereo image. For example, in the case where the inputted stereo image has uniformly-high sharpness in all regions, a process of reducing the sharpness is performed on the regions other than the region of interest paid attention by the user. As another example, in the case where the sharpness of the region of interest paid attention by the user is lower than a region with the highest sharpness on the inputted stereo image, a process of improving the sharpness is performed on the region of interest while the process of reducing the sharpness is performed on the other regions. Note that a process of adding blur may be performed instead of changing the sharpness. In this case, the blur adding process only needs to be performed such that blur in the regions other than the region of interest becomes greater than that in the region of interest. Moreover, the sharpening process and the blur adding process may be combined such that the process of improving the sharpness is performed on the region of interest and the process of adding blur is performed on the regions other than the region of interest. Furthermore, contrast or saturation of the regions other than the region of interest may be reduced.

A process performed in the image processing apparatus 100 of Embodiment 1 is described below with reference to FIGS. 2 and 3.

Figure 2:
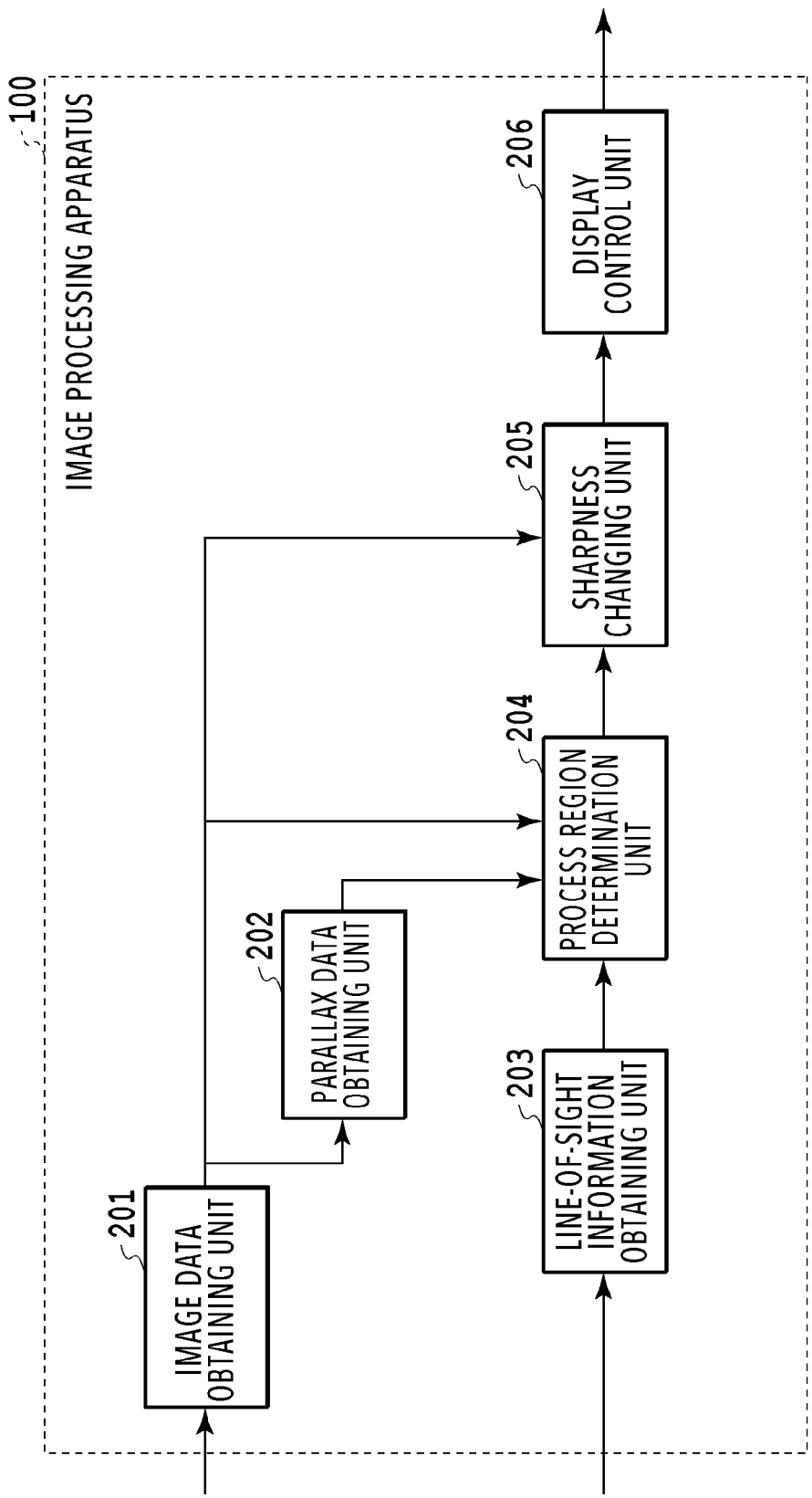
FIG. 2 is a block diagram illustrating a functional configuration of a parallax image generation process in Embodiment 1.
Figure 3:
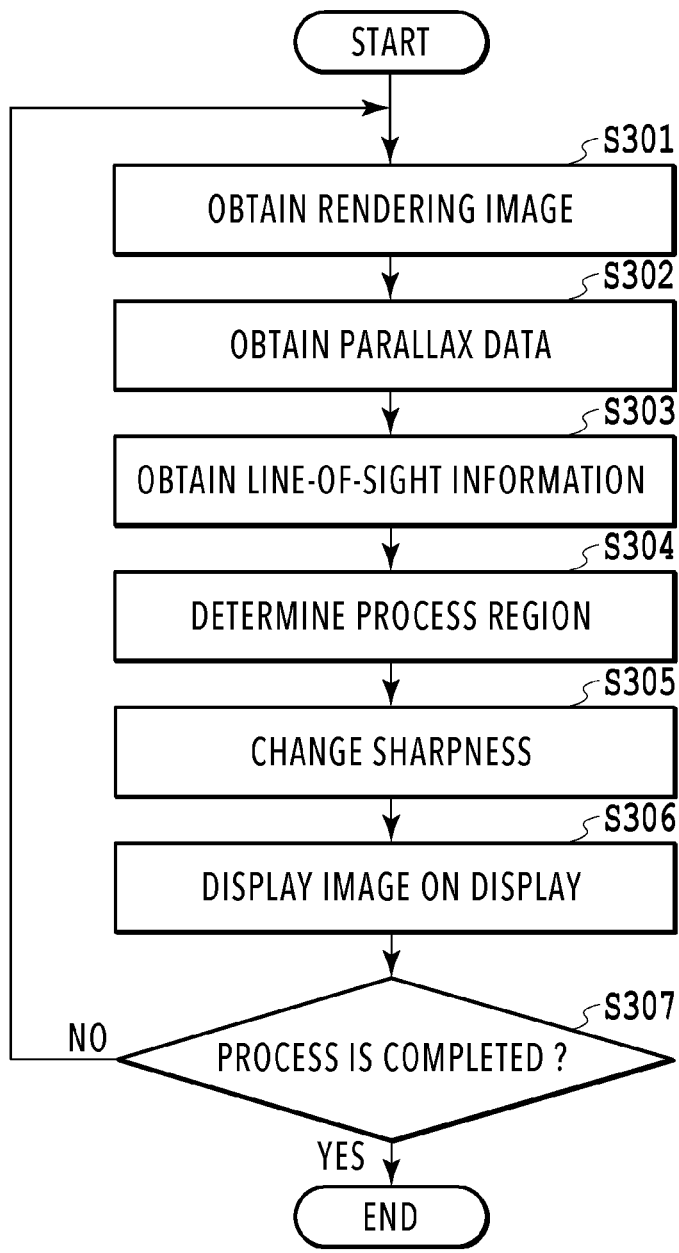
FIG. 3 is a flowchart illustrating a flow of parallax image generation in Embodiment 1.

FIG. 2 is a block diagram illustrating a functional configuration of the image processing apparatus 100. In the image processing apparatus 100, the CPU 101 executes a program stored in the ROM 103 while using the RAM 102 as a work memory to function as component units illustrated in FIG. 2, and executes a series of processes illustrated in the flowchart of FIG. 3. Note that not all of the processes described below have to be executed by the CPU 101, and the image processing apparatus 100 may be configured such that some or all of the processes are executed by one or multiple processing circuits other than the CPU 101.

An image data obtaining unit 201 obtains the stereo image data via the input OF 106 or from the secondary storage device 105. The stereo image data obtained in this image obtaining is stereo image data with parallax including image data for the left eye and image data for the right eye of the head mounted display 132. The stereo image data is generated from a wide-angle stereo image, based on the orientation information obtained by the orientation detection apparatus 133. For example, an image region with a predetermined angle of view is clipped from a super wide-angle stereo image including whole sky images for the left eye and the right eye, for each of optical axis directions of two virtual image capturing apparatuses for the left eye and the right eye, based on the orientation information of the head mounted display 132. The clipped images are subjected to distortion correction and are used as the image for the left eye and the image for the right eye in the stereo image. The user wearing the head mounted display 132 can thereby view a stereographical image that allows the user to feel as if in a sphere to which a whole sky image is projected.

In the present embodiment, the stereo image data is described as color image data in which each of the image data for the left eye and the image data for the right eye has three channels of RGB for each pixel. Note that the stereo image data is not limited to this, and the present embodiment can be similarly applied to the case where the stereo image data is video image data or gray image data with only one channel for each pixel. Moreover, the image data obtaining unit 201 simultaneously obtains rendering information in generation of the stereo image data from the wide-angle stereo image. The rendering information is information on the positions and orientations of the virtual image capturing apparatuses for the left eye and the right eye used to generate the stereo image data and focal lengths of the virtual image capturing apparatuses.

In the present embodiment, three-dimensional coordinate axes set such that a floor surface is x-y axes and a height direction is z axis are defined as a coordinate system of a virtual space in which an object reproducing the position and orientation of the head mounted display 132 is arranged. The rendering information includes the positions of the virtual image capturing apparatuses respectively for the left eye and the right eye, as coordinate values in the three-dimensional coordinate axes. Note that the method of setting the coordinate axes is not limited to this, and another method of setting the coordinate axes such as polar coordinates may be used.

A parallax data obtaining unit 202 obtains the parallax data relating to the stereo image data obtained in the image data obtaining unit 201. In the present embodiment, the parallax data relating to the obtained stereo image data is calculated by a block matching method that is a general method for obtaining the parallax data from the image data for the left eye and the image data for the right eye included in the stereo image data. Note that the method of obtaining the parallax data is not limited to this, and a publicly-known method of calculating a parallax value from the stereo image data may be used. Furthermore, in the case where the obtained stereo image is an image generated by being rendered based on the wide-angle stereo image and includes the parallax data, this parallax data may be obtained. The parallax data in the present embodiment is data that has the same number of pixels as the images for the left eye and the right eye in the stereo image data and that holds the parallax value for each pixel. Note that the format of the parallax data is not limited to this, and may be any format from which the parallax value corresponding to each pixel in the stereo image data can be obtained such as distance data.

Although the stereo image data is rendered based on the wide-angle stereo image data to be in conjunction with the position and orientation of the head mounted display 132 and the thus-generated stereo image data is used in the present embodiment, the stereo image data is not limited to this. The stereo image data only needs to include the image data for the left eye and the image data for the right eye, and may be, for example, stereo image data obtained by simply combining captured image data for the left eye and captured image data for the right eye that have parallax without the rendering process.

A line-of-sight information obtaining unit 203 obtains the line-of-sight information of the user wearing the head mounted display 132 from the line-of-sight detection apparatus 134 via the line-of-sight detection I/F 109. The line-of-sight information in the present embodiment includes a position $(xe_i, ye_i, ze_i)$ of each of the eyes of the user wearing the head mounted display 132 and a unit vector indicating the direction of the line of the sight of each eye $(vxe_i, vye_i, vze_i)$ (i=1, 2) in the aforementioned three-dimensional space. A method of obtaining the line-of-sight information in the present embodiment is such that line-of-sight information each of the left and right eyes of the user is obtained with an image capturing device attached to the inside of the head mounted display 132 by using a publicly-known eye tracking technology. Moreover, the line-of-sight information is not limited to this, and various methods that can identify a position where the user of the head mounted display 132 is paying attention may be used, such as setting three-dimensional coordinate values of a point where the user is paying attention as the line-of-sight information.

A process region determination unit 204 determines a process region in the stereo image data based on the parallax data and the line-of-sight information. In the present embodiment, there is created a sharpness map that has the same number of pixels as the images for the left eye and the right eye in the stereo image data and that can hold a value from 0 to 1 for each pixel, and a pixel region in the stereo image data that corresponds to pixels whose pixel values are 1 in the sharpness map is determined to be the process region.

A specific method of determining the process region is described. As an advance preparation, values for all pixels included in the sharpness map are initialized to 0. First, a position (xt, yt, zt) of a virtual image paid attention by the user is calculated from the line-of-sight information obtained from the line-of-sight information obtaining unit 203. A three-dimensional coordinate position of the subject is calculated as an intersection of left and right vectors whose start points are the positions $(xe_i, ye_i, ze_i)$ of the eyes included in the line-of-sight information and whose directions are the line-of-sight directions $(vxe_i, vye_i, vze_i)$ included in the line-of-sight information. Next, a distance Z from the virtual image capturing apparatuses to the subject is calculated from the position (xt, yt, zt) of the virtual image of interest and the positions of the virtual image capturing apparatuses in the rendering information obtained from the image data obtaining unit 201. In the present embodiment, the distance Z is calculated as a distance between a barycentric position (xc, yc, zc) of the positions of the left and right virtual image capturing apparatuses and the position (xt, yt, zt) of the virtual image of interest.

Figure 4A:
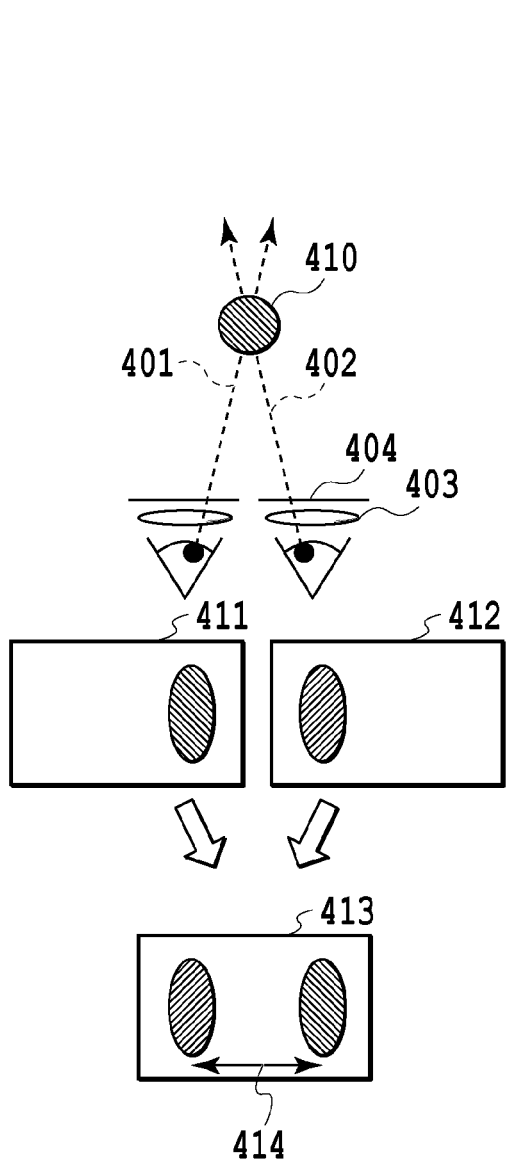
FIG. 4A is a diagram explaining a concept of the parallax image generation process in Embodiment 1.
Figure 4B:
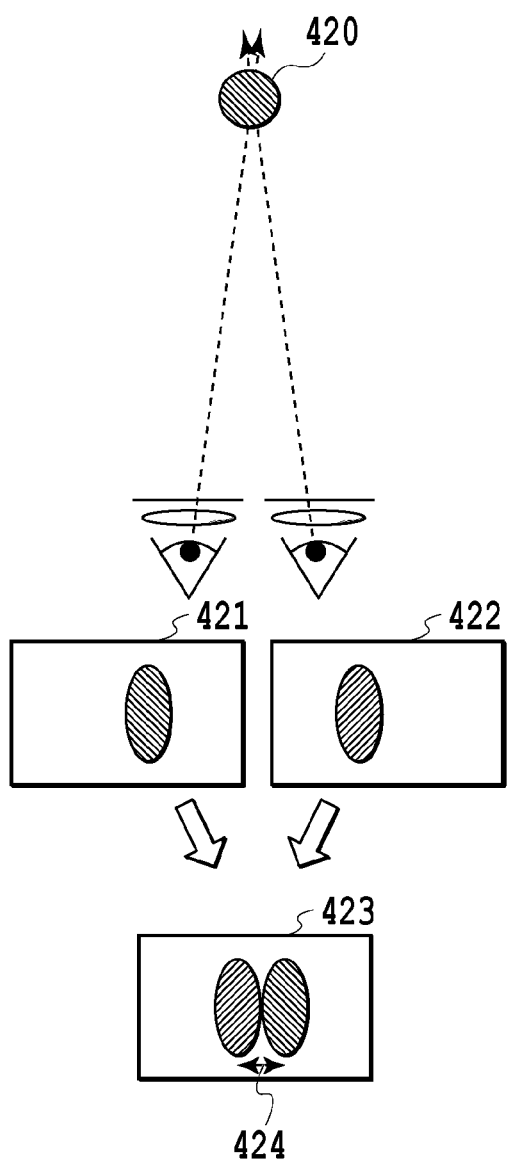
FIG. 4B is a diagram explaining the concept of the parallax image generation process in Embodiment 1.

FIGS. 4A and 4B each illustrate a diagram explaining relationships among the region of interest on the stereo image, the position of the virtual image of the subject of interest perceived by the user, and the line-of-sight directions of the user in the head mounted display 132 in which a lens 403 and a display 404 are arranged in front of each of the left and right eyes. The distance Z to each of virtual images 410 and 420 paid attention by the user is calculated as a distance to an intersection of left and right lines of sight 401 and 402.

The user wearing the head mounted display 132 views the displays 404 through the lenses 403, and thereby perceives videos as the virtual image. In this case, videos with parallax are displayed on the left and right displays 404 to make the user perceive the videos with parallax with the left and right eyes. The user thereby obtains a sense of three-dimensional appearance from the perceived virtual images depending on binocular parallax, an angle of convergence, and the like. The depth of the virtual image perceived in this case varies depending on the magnitude of the parallax of the stereo image displayed on the displays 404. For example, in the case where a position of the subject 410 varies greatly between an image for the left eye 411 and an image for the right eye 412 as illustrated in FIG. 4A and parallax 414 and the angle of convergence are large, the user perceives that the subject 410 is located relatively close to the user. Meanwhile, in the case where the subject 420 is located at similar positions in an image for the left eye 421 and an image for the right eye 422 as illustrated in FIG. 4B and parallax 424 and the angle of convergence are small, the user perceives that the subject 420 is located relatively far away from the user. In the present embodiment, as described later, the distance Z to the virtual image of interest paid attention by the user that is calculated based on the line-of-sight information is converted to a parallax value d in the stereo image, and a pixel region in the stereo image that has the converted parallax value is determined as a region corresponding to the virtual image of interest.

The conversion of the calculated distance Z to the parallax value d is performed by using a base line length T indicating a distance between the virtual image capturing apparatuses and focal lengths f of the virtual image capturing apparatuses in the rendering information obtained from the image data obtaining unit 201. The base line length T can be calculated from the positions of the left and right virtual image capturing apparatuses obtained from the rendering information, as a distance between coordinates in the three-dimensional space. Moreover, the parallax value d is calculated by using d=f×T÷Z that is a relationship between a parallax image and the distance.

Lastly, in the parallax data obtained from the parallax data obtaining unit 202, all pixels that hold the calculated parallax value d are extracted, and pixel values of pixels in the sharpness map whose pixel positions match those of the extracted pixels are changed to 1. In the detection of pixels, the extracted pixels do not have to be limited to those holding the parallax value d, and pixels values may be similarly set to 1 for pixels within a predetermined range from the extracted pixels in consideration of an accuracy error in obtaining of the parallax value in the block matching and variation of parallax in the same subject due to thickness of an object.

A sharpness changing unit 205 changes the sharpness of a pixel region in the stereo image data that matches the pixels positions of the pixels whose pixel values are 1 in the sharpness map, such that the sharpness of the pixel region becomes higher than that of the other regions. The changing of the sharpness is performed as appropriate depending on characteristics of the stereo image. For example, in the case where the stereo image has uniformly-high sharpness in all regions, the process of reducing the sharpness is applied to the regions other than the determined region. As another example, in the case where the sharpness of the determined region on the stereo image is lower than the region with the highest sharpness on the stereo image, the process of improving the sharpness is performed on the determined region and the process of reducing the sharpness is performed on the other regions.

Figure 5A:
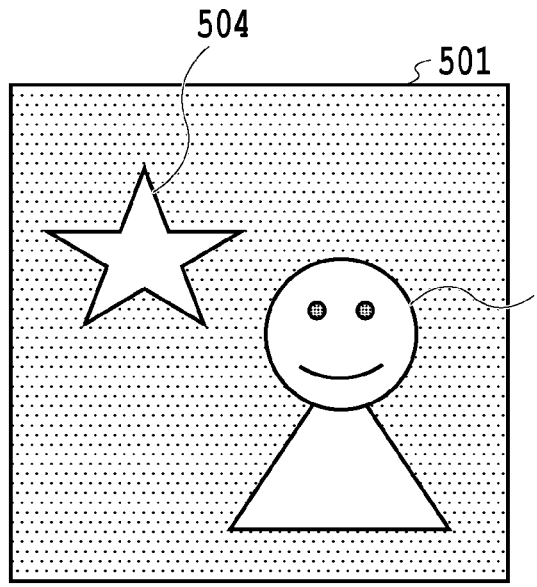
FIG. 5A is a diagram explaining a method of changing sharpness in Embodiment 1.
Figure 5B:
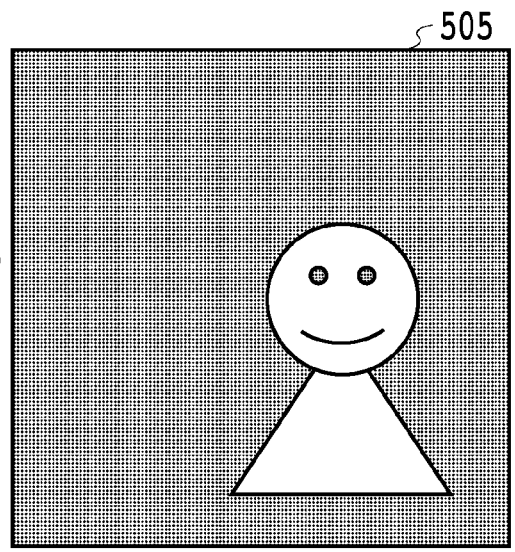
FIG. 5B is a diagram explaining the method of changing sharpness in Embodiment 1.
Figure 5C:
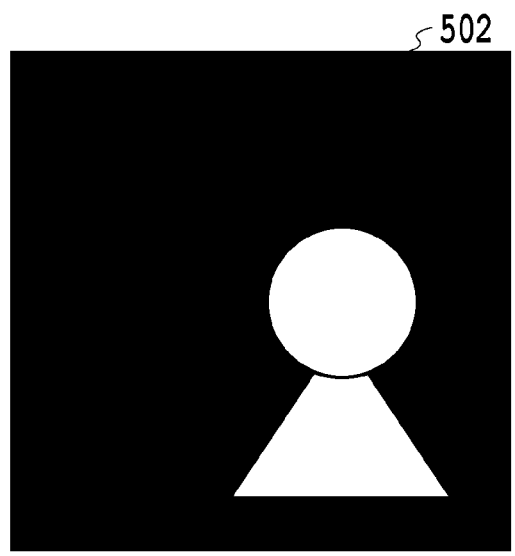
FIG. 5C is a diagram explaining the method of changing sharpness in Embodiment 1.
Figure 5D:
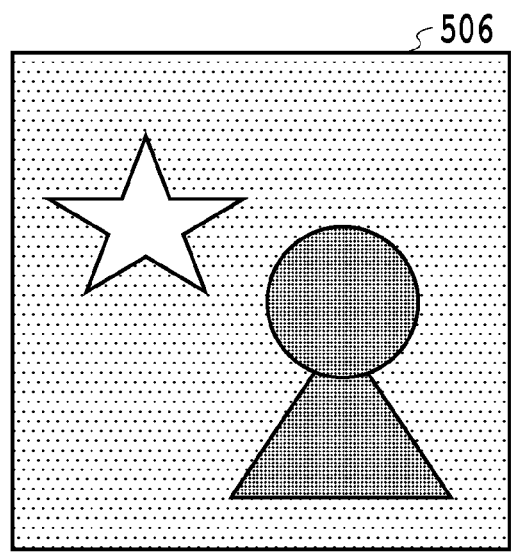
FIG. 5D is a diagram explaining the method of changing sharpness in Embodiment 1.

A method of changing the sharpness is specifically described by using FIGS. 5A and 5D. Note that processes hereinafter are performed on each of the image data for the left eye and the image data for the right eye in the stereo image data.

First, the sharpness changing unit 205 generates two pieces of image data for stereo image data 501, based on a sharpness map 502. A first piece of image data 505 is data in which only the pixels corresponding to the pixels whose pixel values are 1 in the sharpness map 502 have the same pixel values as those in the stereo image data 501 and the other pixels have a uniform pixel value. A second piece of image data 506 is data in which only the pixels corresponding to the pixels whose pixel values are 0 in the sharpness map 502 have the same pixel values as those in the stereo image data 501 and the other pixels have a predetermined uniform pixel value. The uniform pixel value in these cases may be any value. Hereinafter, the image data 505 is referred to as image data for high sharpness and the image data 506 is referred to as image data for low sharpness.

Next, the generated image data for high sharpness 505 and image data for low sharpness 506 are subjected to frequency filtering by using different filters for the respective pieces of data. A high-pass filter that can emphasize high-frequency regions is used for the image data for high sharpness 505. A low-pass filter that can remove high-frequency components while leaving only the low-frequency components is used for the image data for low sharpness 506. The image data for high sharpness 505 after the filtering process thereby becomes a sharper image than that before the filtering process, and the image data for low sharpness 506 after the filtering process becomes an image that is more blurred than that before the filtering process. Note that a frequency allowed to pass through each of the high-pass filter and the low-pass filter may be set to any frequency, and may be set as desired as long as there is no overlapping or only a small overlapping of the passed frequencies between the filters.

Lastly, the image data for high sharpness 505 after the filtering process and the image data for low sharpness 506 after the filtering process are integrated. In the integration, the pixels corresponding to the pixels whose pixels values are 1 in the sharpness map 502 are used from the image data for high sharpness 505 after the filtering process, and the pixels corresponding to the pixels whose pixels values are 0 in the sharpness map 502 are used from the image data for low sharpness 506 subjected to the filtering process.

The aforementioned process can generate stereo image data in which only the region determined to make the sharpness thereof high by the process region determination unit 204 has high sharpness.

Although the sharpness change is performed by using frequency filtering in the present embodiment, the sharpness change is not limited to this, and may be performed by using spatial filtering or learning. For example, in the case where the spatial filtering is used, a sharpening filter is used for the image data for high sharpness 505, and an averaging filter or the like is used for the image data for low sharpness 506. Moreover, a used filter size and the number of times of filtering process may be changed for every pixel. For example, in the case where the degree of sharpness varies among regions in the image data for low sharpness 506, there may be performed appropriate setting such as setting the number of times of filtering process in a region with relatively high sharpness larger than that in a region with relatively low sharpness.

A display control unit 206 outputs the stereo image data that is generated in the sharpness changing unit 205 and in which the sharpness is changed, to the head mounted display 132, and displays the stereo image on the head mounted display 132.

A flow of processes performed by the respective component units are described below.

In S301, the image data obtaining unit 201 obtains the stereo image data via the input I/F 106 or from the secondary storage device 105, and outputs the stereo image data to the parallax data obtaining unit 202, the process region determination unit 204, and the sharpness changing unit 205.

In S302, the parallax data obtaining unit 202 obtains the parallax data corresponding to the stereo image data obtained from the image data obtaining unit 201, and outputs the parallax data to the process region determination unit 204.

In S303, the line-of-sight information obtaining unit 203 obtains the line-of-sight information of the user wearing the head mounted display 132 from the line-of-sight detection apparatus 134 via the line-of-sight detection I/F 109, and outputs the line-of-sight information to the process region determination unit 204.

In S304, the process region determination unit 204 generates the sharpness map based on the parallax data obtained from the parallax data obtaining unit 202 and the line-of-sight information obtained from the line-of-sight information obtaining unit 203, and outputs the generated sharpness map to the sharpness changing unit 205.

In S305, the sharpness changing unit 205 performs the sharpness change image process on the stereo image data obtained from the image data obtaining unit 201, based on the sharpness map obtained from the process region determination unit 204. The sharpness changing unit 205 outputs the stereo image data in which the sharpness is changed, to the display control unit 206.

In S306, the display control unit 206 outputs the stereo image data in which the sharpness is changed by the sharpness changing unit 205, to the head mounted display 132, and displays the stereo image on the head mounted display 132.

In S307, the display control unit 206 determines whether to display a next stereo image on the head mounted display 132. The next stereo image data corresponds to, for example, image data of the next frame in a video or the like. In the case where the next stereo image data is present (S307: YES), the process returns to S301 again and the series of processes is repeated. In the case where the next stereo image data is absent (S307: NO), the present process is terminated.

That is the process executed by the image processing apparatus 100 in the present embodiment.

In the present embodiment, the region of interest of the user in the stereo image data is identified based on the distance to the virtual image of interest viewed by the user wearing the head mounted display 132 and the parallax data of the stereo image data. Moreover, the filtering process is performed such that the identified region of interest has high sharpness and the other regions have lower sharpness than the region of interest. This allows the inputted stereo image data to be converted to the stereo image data in which the region where the user is paying attention is sharper than the other regions.

Displaying the stereo image converted as described above on the display apparatus such as the head mounted display can reduce fatigue due to an increase in cognitive load such as eyestrain that is caused by mismatch between the focal length and the angle of convergence, and can improve realistic sensations. Note that the display apparatus to which the present embodiment can be applied is not limited to the head mounted display, and may be any display apparatus than can display the stereo image individually for the left eye and the right eye.

Embodiment 2

In Embodiment 1, description is given of the process of changing the sharpness depending on the line-of-sight information of the user wearing the head mounted display 132 for all pieces of obtained stereo image data. In Embodiment 2, there is added a process in which, in the case where the obtained stereo image data is video data including multiple frames, the image processing apparatus 100 determines whether to perform the sharpness change depending on a difference in the parallax data between a process target frame at which the sharpness is to be changed and a detection target frame at which the line-of-sight information is detected.

Figure 6:
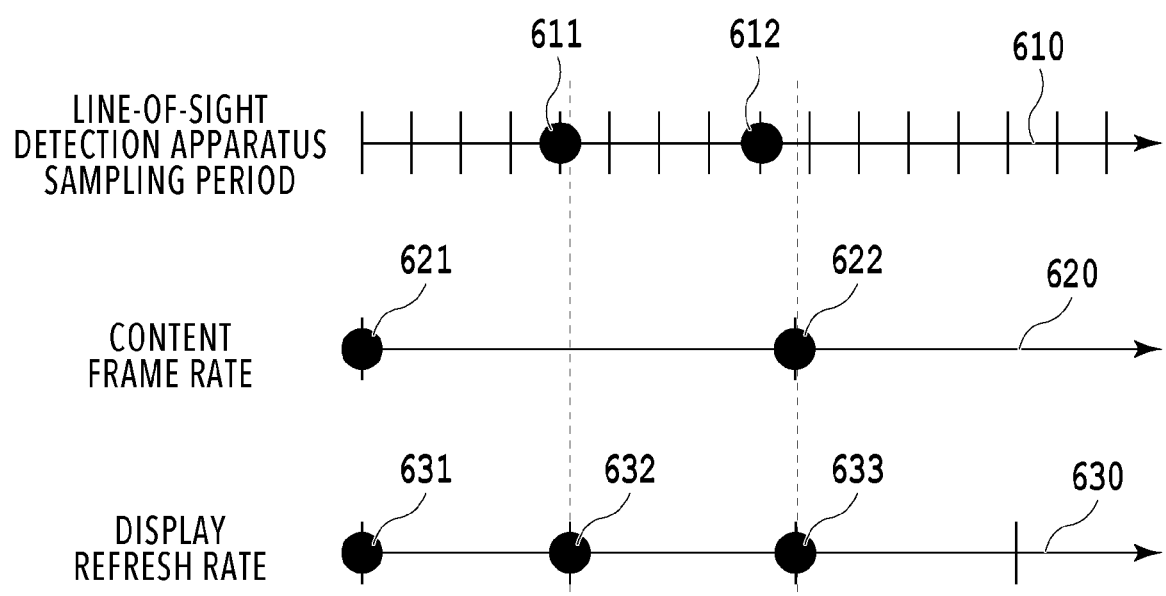
FIG. 6 is a diagram explaining a concept of a parallax image generation process in Embodiment 2.

FIG. 6 illustrates a diagram explaining an outline of a method of determining whether the sharpness change is necessary, which is performed in the present embodiment. In Embodiment 1, the sharpness of the stereo image data is changed by using the line-of-sight information obtained from the line-of-sight information obtaining unit 203 for the stereo image viewed by the user, and the stereo image is displayed on the head mounted display 132. In this case, if the stereo image is a video with a certain frame rate, object arrangement and the like sometimes vary greatly between the detection target frame that is viewed by the user in the obtaining of the line-of-sight information and at which the line-of-sight information is detected and the process target frame at which the sharpness is to be changed.

In the example illustrated in FIG. 6, a sampling period 610 of the line-of-sight information obtaining unit 203, a frame rate 620 of a content, and a refresh rate 630 of the head mounted display 132 vary from one another. A detection target frame that is displayed at a display timing 631 and at which the line-of-sight information is detected is a frame 621, and a detection target frame displayed at a display timing 632 is a process target frame obtained by subjecting the frame 621 to the sharpness change based on the line-of-sight information. As the line-of-sight information used for this sharpness change, data at the latest detection timing 611 before the display timing 632 or, depending on processing time, data before the detection timing 611 is used. In this case, the detection target frame at which the line-of-sight information is detected coincides with the process target frame at which the sharpness is changed based on the detected line-of-sight information.

Meanwhile, a detection target frame after the sharpness change that is displayed at a display timing 633 is a frame obtained by subjecting a frame 622 to the sharpness change based on the line-of-sight information. As the line-of-sight information used for this sharpness change, data at the latest detection timing 612 before the display timing 633 is used. In this case, the line-of-sight information at the detection timing 612 is data obtained in the case where the user is viewing the detection target frame displayed at the display timing 632, that is the frame 621. In this case, the detection target frame at which the line-of-sight information is detected is different from the process target frame at which the sharpness is changed based on the detected line-of-sight information.

A situation where the detection target frame at which the line-of-sight information is detected and the process target frame at which the sharpness is changed are different occurs in many cases, though this depends on relationships among the sampling period of the line-of-sight information obtaining unit 203, the frame rate of the content, and the refresh rate of the display. As a result, in the case where a large change in arrangement of objects or the like occurs between these frames and the sharpness change process is directly performed, there is a possibility that a region that does not have to have high sharpness has high sharpness and, conversely, a region that should not have low sharpness has low sharpness. This effect notably appears particularly at switching of scenes in the contents. Accordingly, in Embodiment 2, the process of changing the sharpness is performed only in the case where predetermined conditions are satisfied, and the unnecessary sharpness change process is suppressed.

As a specific process, in Embodiment 2, in addition to the processes of Embodiment 1, there is obtained the parallax data in the detection target frame at which the line-of-sight information is detected and that is displayed at a display timing just before the process target frame. Hereinafter, the parallax data at the process target frame at which the sharpness is to be changed is referred to as first parallax data, and the parallax data in the detection target frame displayed at the display timing just before the process target frame is referred to as second parallax data.

Figure 7:
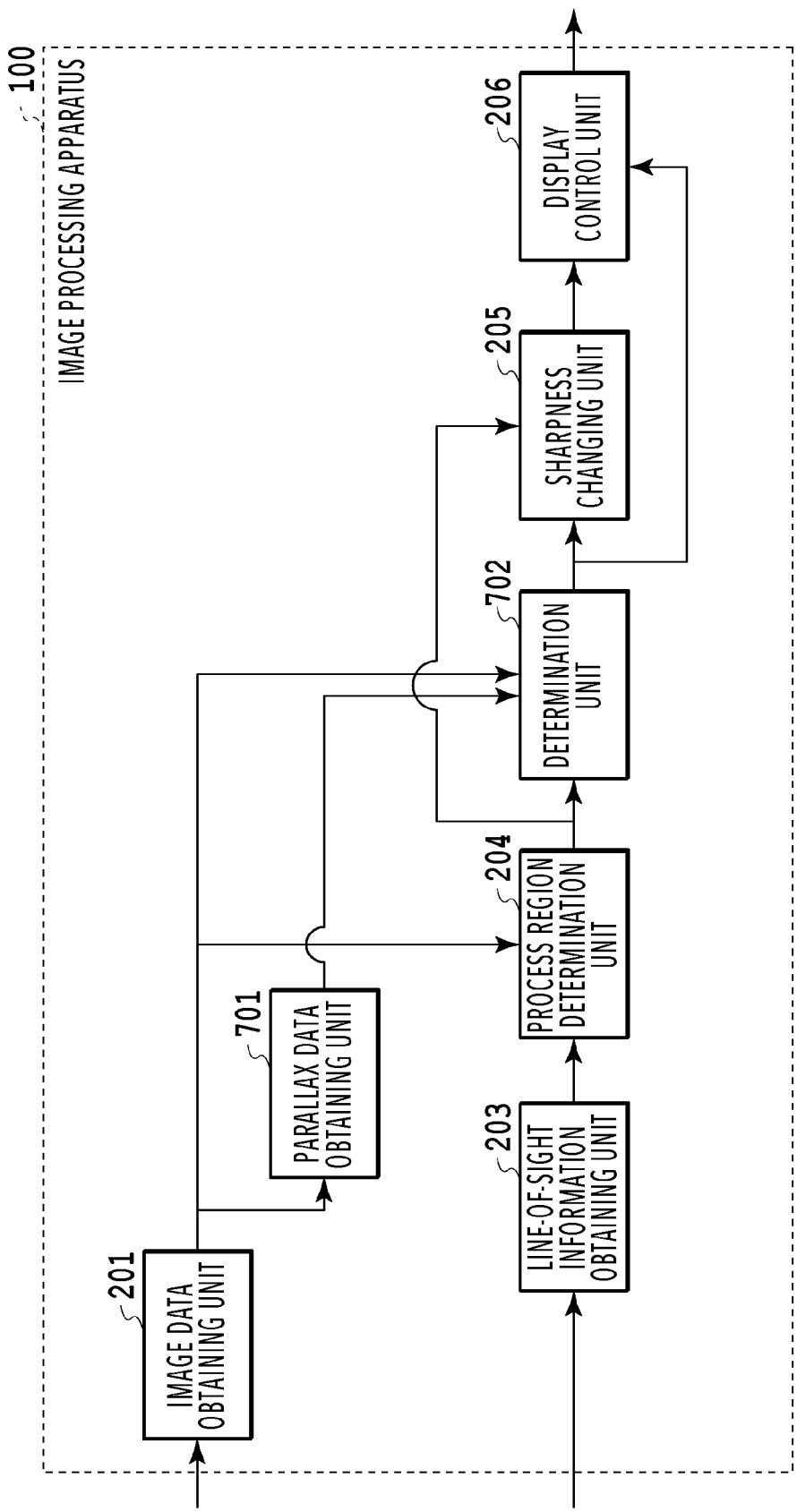
FIG. 7 is a block diagram illustrating a functional configuration of the parallax image generation process in Embodiment 2.
Figure 8:
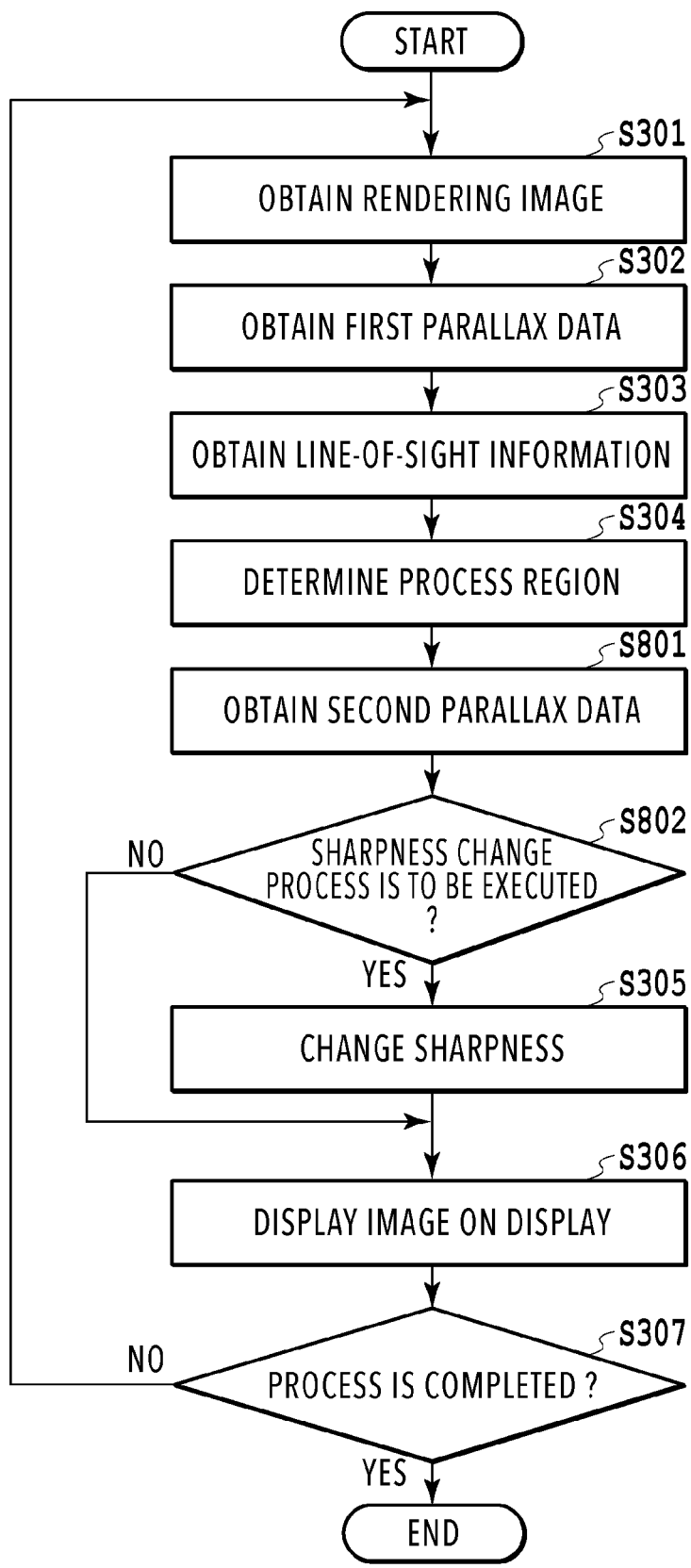
FIG. 8 is a flowchart illustrating a flow of parallax image generation in Embodiment 2.

A determination process performed in the image processing apparatus 100 of the present embodiment is described below. FIG. 7 illustrates a block diagram illustrating a functional configuration example of the image processing apparatus 100 in the present embodiment. In the image processing apparatus 100, the CPU 101 executes a program stored in the ROM 103 illustrated in FIG. 1 while using the RAM 102 as a work memory, and thereby functions as component units illustrated in FIG. 7 to execute a series of processes illustrated in the flowchart of FIG. 8. Note that not all of the processes described below have to be executed by the CPU 101, and the image processing apparatus 100 may be configured such that some or all of the processes are executed by one or multiple processing circuits other than the CPU 101. Configurations and processes similar to those in Embodiment 1 are denoted by reference signs similar to those in Embodiment 1, and description thereof is omitted.

A parallax data obtaining unit 701 in the present embodiment obtains, in addition to the first parallax data of the process target frame at which the sharpness is to be changed, the parallax data of the detection target frame that is displayed just before the process target frame and at which the parallax information is detected, as the second parallax data. Note that the second parallax data is assumed to have the same data format as the first parallax data. The second parallax data may be such that pieces of parallax data obtained by the parallax data obtaining unit 701 are held in the RAM 102 or the ROM 103, and the parallax data obtaining unit 701 obtains the second latest piece of data among the held pieces of parallax data as the second parallax data. The parallax data obtaining unit 701 outputs the obtained first parallax data to a determination unit 702 as well as the process region determination unit 204, and outputs the second parallax data to the determination unit 702.

The determination unit 702 determines whether to perform the process of changing the sharpness on the process target frame having the first parallax data, by using the first parallax data and the second parallax data. In the present embodiment, the determination unit 702 compares the first parallax data and the second parallax data corresponding to the pixel region in which the pixel values of the sharpness map are 1 and that is obtained from the process region determination unit 204. Specifically, the determination unit 702 obtains an average parallax value for the pixel region corresponding to the region in which the pixel values of the sharpness map are 1, in each of the first parallax data and the second parallax data. In the case where a difference of the average parallax value is equal to or smaller than a predetermined threshold, the determination unit 702 determines that the sharpness change process is to be executed. In the case where the difference is larger than the predetermined threshold, the determination unit 702 determines that the sharpness change process is not to be performed.

Processes and configurations newly added in Embodiment 2 are described below.

In S801, the parallax data obtaining unit 701 obtains the second parallax data. The parallax data obtaining unit 701 outputs the obtained second parallax data to the determination unit 702.

In S802, the determination unit 702 determines whether to change the sharpness, by using the sharpness map obtained from the process region determination unit 204, the first parallax data obtained from the parallax data obtaining unit 202, and the second parallax data obtained from the parallax data obtaining unit 701. In the case where the difference of the parallax value is smaller than any given threshold, the determination unit 702 determines that a change from a frame previous to the target at which the user is paying attention is small, and determines to change the sharpness. The process then proceeds to S305. Meanwhile, in the case where the difference of the parallax value is equal to or larger than the given threshold, the determination unit 702 determines not to change the sharpness. The process then proceeds to S307, and the determination unit 702 outputs the stereo image data obtained from the image data obtaining unit 201, to the display control unit 206.

Although the average parallax value is used in the determination of the difference between the first parallax data and the second parallax data in the present embodiment, the configuration is not limited to this, and other statistical values such as a median value may be used. Moreover, a parallax value in a representative pixel such as a pixel at a center position in the region in which the pixel values of the sharpness map are 1 may be used instead of the statistical values.

That is the process performed in the image processing apparatus 100 of Embodiment 2. In Embodiment 2, the determination unit is added to Embodiment 1, and the process of determining whether to change the sharpness of the stereo image data is added. This suppresses the unnecessary sharpness change process, and more natural stereo image data in which a subject paid attention by the user is in focus can be displayed in a time-series direction irrespective of details of the content. Thus, it is possible to reduce eyestrain of the user and improve realistic sensations.

Other Embodiments

Embodiments of the present disclosure are not limited to Embodiments 1 and 2 described above, and various embodiments may be adopted. For example, in Embodiments 1 and 2, the pixel values in the sharpness map generated in the process region determination unit 204 are expressed in binary values such that the pixel values of pixels in which the sharpness is set to be high is expressed as 1 and the pixel values of the other pixels are expressed as 0. However, the pixels values may be expressed in multi-values including decimals or in multi-values from 0 to 255. For example, the sharpness map is set such that the closer the position is to the center of the line of sight of the user wearing the head mounted display 132, the higher the sharpness is, and the sharpness decreases from the center toward the periphery. Specifically, the process region determination unit 204 first calculates the coordinate position (xt, yt, zt) of the virtual image paid attention by the user in the virtual three-dimensional space, from the line-of-sight information obtained from the line-of-sight information obtaining unit 203. Then, the process region determination unit 204 identifies the pixel position paid attention by the user on the stereo image data obtained by capturing images with the virtual image capturing apparatuses, from the coordinate position (xt, yt, zt). Next, the process region determination unit 204 identifies the pixel that is closest to the identified pixel position and that has the parallax value d converted from the distance to the virtual image of interest, on the parallax data of the stereo image data obtained from the parallax data obtaining unit 202, and sets the identified pixel as a start pixel position. Then, the process region determination unit 204 sets the pixel value of the pixel on the sharpness map that is at the same position as the identified start pixel position, to a maximum value such as 1 or 255. Lastly, the process region determination unit 204 sets the values of the sharpness map such that the values of the sharpness map linearly or non-linearly decrease with an increase in the distance between the pixel position and the start pixel position.

Moreover, although the stereo image obtained by capturing images with the image capturing device including multiple lenses and the stereo image created as CG are described in the aforementioned embodiments, the form of the stereo image is not limited to these. Specifically, the stereo image may be a stereo image obtained by superimposing an image obtained by rendering CG onto a stereo image captured by a camera (so-called outward-facing camera) that is included in a head mounted display and that captures images in a direction in which the wearer of the head mounted display is viewing.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

In the present disclosure, it is possible to reduce cognitive load of a viewer viewing a stereo image and improve realistic sensations and a sense of immersion.

This application claims the benefit of Japanese Patent Application No. 2022-015888 filed Feb. 3, 2022, which is hereby incorporated by reference herein in its entirety.

What is claimed is:

1. An image processing apparatus comprising:
one or more hardware processors; and
one or more memories storing one or more programs configured to be executed by the one or more hardware processors, the one or more programs including instructions for:
(1) obtaining a captured image which is a stereo image including an image for a left eye and an image for a right eye with parallax, the captured image being such an image that a focal length in image capturing is predetermined;
(2) performing different image processes respectively on (a) a region of interest paid attention by a viewer viewing the stereo image displayed on a display apparatus and (b) a region other than the region of interest, based on line-of-sight information of the viewer, without changing the focal length in the stereo image; and
(3) causing the display apparatus to display the stereo image in which sharpness is changed by the image processes, with an exception in that, in the case where (a) the obtained stereo image is a video and (b) a frame in the stereo image does not satisfy a predetermined condition, the display apparatus is caused to display the frame without the image processes,
wherein the predetermined condition is a condition in which a magnitude of a difference between a parallax value in the region of interest of a target frame to be displayed on the display apparatus and a parallax value in the region of interest of a latest frame displayed on the display apparatus is a predetermined threshold or smaller.

2. The image processing apparatus according to claim 1, wherein the different image processes are (1) image processes of making sharpness of the region of interest higher than sharpness of the region other than the region of interest or (2) image processes of making saturation of the region other than the region of interest lower than saturation of the region of interest.

3. The image processing apparatus according to claim 2, wherein the different image processes respectively vary a frequency of a frequency filtering process applied to the region of interest from a frequency of a frequency filtering process applied to the region other than the region of interest.

4. The image processing apparatus according to claim 2, wherein the different image processes respectively vary the number of times a filtering process is applied to the region of interest from the number of times the filtering process is applied to the region other than the region of interest.

5. The image processing apparatus according to claim 1, wherein the one or more programs further include instructions for:
calculating a parallax value from the line-of-sight information;
obtaining the parallax value of each pixel in the stereo image; and
setting, as the region of interest, a pixel in the stereo image whose obtained parallax value is the same as the calculated parallax value.

6. The image processing apparatus according to claim 5, wherein the one or more programs further include instructions for:
calculating a distance to a virtual image paid attention to by the viewer, from the line-of-sight information; and
calculating the parallax value from the distance.

7. The image processing apparatus according to claim 5, wherein the one or more programs further include instructions for:
calculating the parallax value of each of the pixels in the stereo image, from the image for the left eye and the image for the right eye in the stereo image.

8. The image processing apparatus according to claim 1, wherein the one or more programs further include instructions for:
performing a sharpening process or a blur-adding process as the image processes.

9. The image processing apparatus according to claim 1, wherein the one or more programs further include instructions for:
performing a sharpening process on the region of interest; and
performing a blur-adding process on the region other than the region of interest.

10. The image processing apparatus according to claim 1, wherein the one or more programs further include instructions for:
displaying a target frame on the display apparatus without the image processes in the case where the difference is larger than the predetermined threshold; and displaying the target frame on the display apparatus after the image processes have been performed in the case where the difference is equal to or less than the predetermined threshold.

11. The image processing apparatus according to claim 1, wherein the one or more programs further include instructions for:
performing the image processes such that sharpness is highest at a center of the region of interest and decreases gradually from the center toward a periphery.

12. The image processing apparatus according to claim 1, wherein the display apparatus is capable of projecting only the image for the left eye to the left eye of the viewer and projecting only the image for the right eye to the right eye of the viewer.

13. The image processing apparatus according to claim 1, wherein the display apparatus is a head-mounted display.

14. An image processing method comprising:
obtaining a captured image which is a stereo image including an image for a left eye and an image for a right eye with parallax, the captured image being such an image that a focal length in image capturing is predetermined;
performing different image processes respectively on a region of interest paid attention by a viewer viewing the stereo image displayed on a display apparatus and a region other than the region of interest, based on line-of-sight information of the viewer, without changing the focal length in the stereo image; and
causing the display apparatus to display the stereo image in which sharpness is changed by the image processes, with an exception in that, in the case where (1) the obtained stereo image is a video and (2) a frame in the stereo image does not satisfy a predetermined condition, the display apparatus is caused to display the frame without the image processes,
wherein the predetermined condition is a condition in which a magnitude of a difference between a parallax value in the region of interest of a target frame to be displayed on the display apparatus and a parallax value in the region of interest of a latest frame displayed on the display apparatus is a predetermined threshold or smaller.

15. A non-transitory computer readable computer-readable storage medium storing a program for causing a computer to execute a method comprising: obtaining a captured image which is a stereo image including an image for a left eye and an image for a right eye with parallax, the captured image being such an image that a focal length in image capturing is predetermined;
performing different image processes respectively on a region of interest paid attention by a viewer viewing the stereo image displayed on a display apparatus and a region other than the region of interest, based on line-of-sight information of the viewer, without changing the focal length in the stereo image; and
causing the display apparatus to display the stereo image in which sharpness is changed by the image processes, with an exception in that, in the case where (1) the obtained stereo image is a video and (2) a frame in the stereo image does not satisfy a predetermined condition, the display apparatus is caused to display the frame without the image processes,
wherein the predetermined condition is a condition in which a magnitude of a difference between a parallax value in the region of interest of a target frame to be displayed on the display apparatus and a parallax value in the region of interest of a latest frame displayed on the display apparatus is a predetermined threshold or smaller.

\* \* \* \* \*